United States Patent
Baier et al.

(10) Patent No.: US 7,234,374 B2
(45) Date of Patent: Jun. 26, 2007

(54) ECCENTRIC SHAFT FOR AN INTERNAL COMBUSTION ENGINE

(75) Inventors: Wolfgang Baier, Obbach (DE);
Manfred Mäthner, Leingarten (DE);
Dankwart Eiermann, Weißenberg (DE); Rudolf Klotz, Cottbus (DE);
Michael Schirmer, Zermsdorf (DE)

(73) Assignee: Wankel Super Tec GmbH, Cottbus (DE)

( * ) Notice: Subject to any disclaimer, the term of this patent is extended or adjusted under 35 U.S.C. 154(b) by 29 days.

(21) Appl. No.: 11/062,259

(22) Filed: Feb. 18, 2005

(65) Prior Publication Data
US 2005/0183539 A1    Aug. 25, 2005

(30) Foreign Application Priority Data
Feb. 20, 2004  (DE) ...................... 10 2004 008 311

(51) Int. Cl.
*F16C 3/04*     (2006.01)
*F16C 11/00*    (2006.01)
(52) U.S. Cl. .............................. 74/598; 74/597; 74/605
(58) Field of Classification Search ................ 74/595,
74/596, 597, 598, 599, 600, 601, 602, 603,
74/604, 605; 123/218; 418/94; 284/389;
464/7, 182
See application file for complete search history.

(56) References Cited

U.S. PATENT DOCUMENTS 3,193,187 A * 7/1965 Jones et al. .................... 418/60
3,352,290 A * 11/1967 Kuroda ......................... 418/60

* cited by examiner

*Primary Examiner*—Richard Ridley
*Assistant Examiner*—Terence Boes
(74) *Attorney, Agent, or Firm*—Cohen Pontani Lieberman & Pavane LLP

(57) ABSTRACT

An eccentric shaft for an internal combustion engine, especially for a rotary combustion engine, the working unit of which comprises essentially a peripheral housing, side housing plates, and a triangular piston mounted on an eccentric of an eccentric shaft, the tips of the piston moving along an epitrochoidal orbit inside the peripheral housing to form three separate working spaces, where the rotary combustion engine can have several working units. The eccentric shaft consists of several parts, which have radial teeth at their ends, by means of which these shaft parts can be connected positively to each other by the use of a tie rod. In rotary piston engines with more than one working unit, as many inner shaft parts of identical design as there are working units can be used in modular fashion to construct the eccentric shaft.

4 Claims, 3 Drawing Sheets

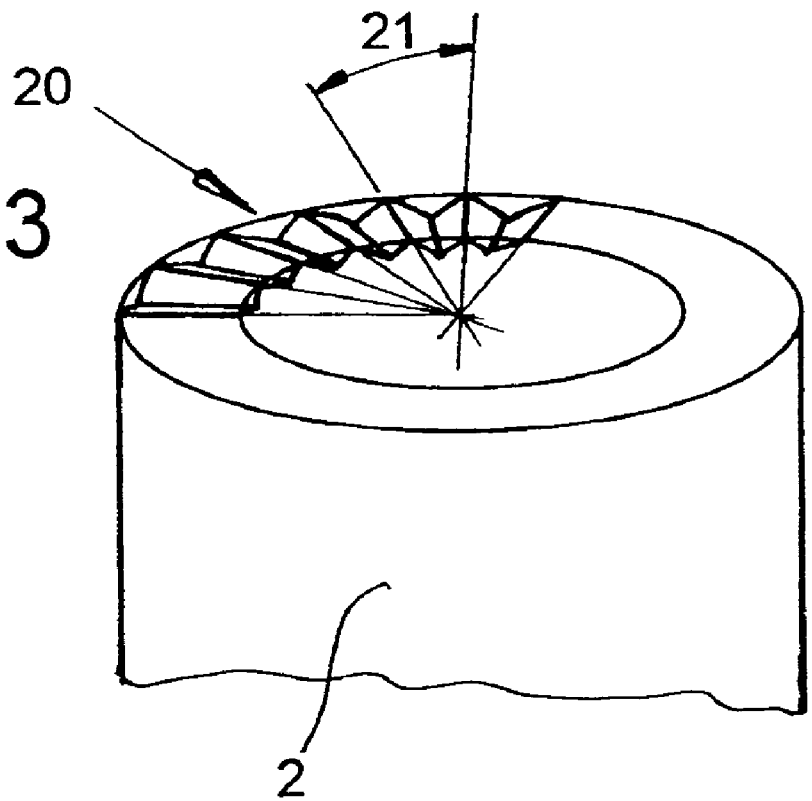
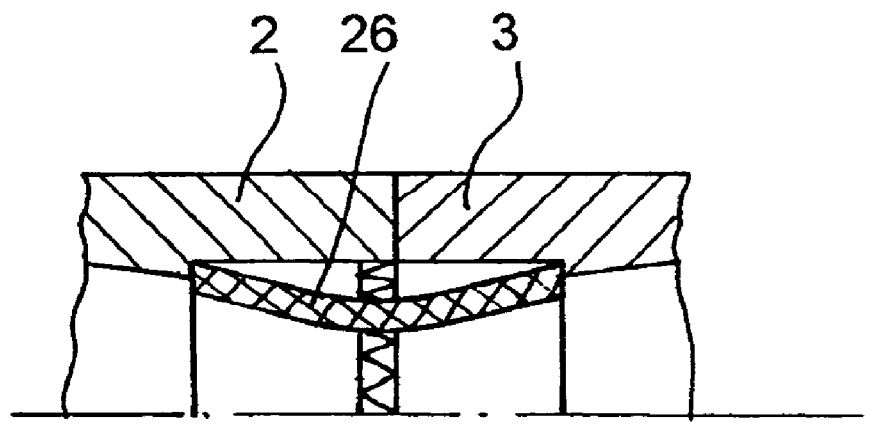

ECCENTRIC SHAFT FOR AN INTERNAL COMBUSTION ENGINE

BACKGROUND OF THE INVENTION

1. Field of the Invention

The invention pertains to a crankshaft, especially to an eccentric shaft for an internal combustion engine, especially for a rotary combustion engine, the working unit of which comprises essentially a peripheral housing, side housing plates, and a piston, which is supported on an eccentric of the eccentric shaft, the tips of the piston rotating along an epitrochoidal orbit inside the peripheral housing to form three separate working spaces, where the rotary piston engine can have several working units.

2. Description of the Related Art

Rotary combustion engines of the conventional type have eccentric shafts which consist of a heat-resistant steel with a hardenable surface, the final form of the eccentric shaft being produced from the solid rough forging by turning, case hardening, and grinding. The most common rotary piston engine being built today is an engine with two working units; that is, the eccentric shaft has two eccentrics, each of which has its own eccentric bearing, and on each of which a piston is supported. Each piston rotates in its own housing, consisting of a peripheral housing and two side housing plates. At the point where the two working units are connected, the side housing plates in question merge into a single center plate, which has a main bearing just as the outer side housing plates have.

The solid eccentric shaft has a bore drilled through its center to allow passage of lubricating oil, which is sent by an oil pump from a supply tank to the main bearings and to the eccentric bearings. The lubricating oil is introduced from an annular channel radially on the outside into the central bore. It is, of course, expensive to produce an eccentric shaft of this type, but in addition little or no advantage can be taken of the ability of the lubricating oil to cool the eccentric shaft, because the amount of heat which can be dissipated across the surface of the relatively small central bore is very low.

SUMMARY OF THE INVENTION

In a further development of the design described above, it is proposed that the eccentric shaft be assembled from several parts, where, for example, the eccentric shaft for a rotary piston engine with one working unit would consist of at least two parts, namely, a front shaft part and a rear shaft part. The end surfaces of these parts have profiles, which match each other and thus can be fitted together in such a way that during assembly a positive connection can be established between two shaft parts by means of a tie rod. The profile for establishing this positive, nonrotatable connection between the shaft parts is designed as a set of radial teeth, which are ideal for use specifically on the end surfaces of tubular bodies. The tie rod extends coaxially through the shaft parts, which, on condition that the radial teeth have been made with precision, can be fitted together without runout, without wobble, and with perfect centering. This precision processing can be carried out by mounting the shaft part to be provided with the radial teeth carefully between the centers of an impact-turning machine. The shaft part should be provided with a conical surface on the inner diameter of at least one of its end surfaces to fit the shape of the center of the machine in question.

It has been found to be especially advantageous for the flanks of the radial teeth to depart from their ideal form by raising their radially outer flank areas slightly to ensure that, after the shaft parts in question have been assembled, the outer areas of the flanks of the joint site are in fact bearing the load.

An eccentric shaft for a rotary piston engine with several working units consists preferably of the front shaft part, at least one inner shaft part, and the rear shaft part, which means that, when a single center part is used, this must have a set of radial teeth at each end. Like other types of rotationally symmetric bodies, radial teeth are impact-turned. That is, they are machined by a rotating cutter. Straight contours such as the radially oriented flanks of the radial teeth are made by rotating not only the cutting tool but also the workpiece during the machining process. The synthesis of the two circular paths results in a straight cut, when such a cut is required.

Another method for the production of shaft parts in series is also advantageous, namely, the hammering of solid stock over a mandrel. By this method hollow, tubular, rotationally symmetric bodies can be produced in series with high dimensional accuracy with respect to their outer diameters and with reproducible inner contours. This swarfless (non-cutting) production method makes it possible to eliminate almost completely the need to turn massive blanks and to begin with the grinding operation immediately after hardening. The front and the rear shaft parts can be manufactured by the same production method as that used for the inner shaft part, which provides a basis for low-cost mass production.

Because, as indicated above, the shaft parts and their end surfaces should be tubular, it is a logical next step to leave a sufficiently large annular space around the tie rod to allow the passage of lubricating oil. The inner shaft parts will thus be tubular throughout, and the front shaft parts and the rear shaft parts will be at least partially tubular. The surface area in the interior of the eccentric shaft is, as a result, large enough for effective heat exchange, and weight is also saved at the same time. The annular space is connected both to the lubricating oil reservoir of the rotary piston engine and, via a first lubricating oil bore, to a first main bearing in a first sun wheel; possibly via a second lubricating oil bore to a second main bearing in a second sun wheel; via a third lubricating oil bore to an eccentric bearing; and via a fourth lubricating oil bore to the main bearing at the rear. The annular space therefore serves as a connecting space through which the lubricating oil can reach all the bearings of the rotary piston engine.

It is known that sets of radial teeth are not leak-tight even when assembled under pretension, because recesses are located at the base of the grooves to accommodate the tips of the opposing teeth. To prevent pressurized lubricating oil from escaping at the joint sites without having served its intended purpose of lubricating the bearings, therefore, it is proposed that the joint sites be sealed by the insertion of ring-shaped, tubular seals, which are laid in place in specially turned grooves before the toothed parts are assembled. When the tie rod is tightened, the seals are clamped in the grooves so that they completely cover the joints between the sets of radial teeth from the inside. Although the annular space is restricted to a certain extent by these seals, the flow of lubricating oil remains intact. Because the oil reaches high temperatures, the seal consists preferably of a heat-resistant material capable of only slight elastic deformation. Seals of metal which are elastic only at their contact surfaces can also be used. A suitable idea here is to use a section of tubing with suitable material vulcanized onto its end surface, i.e., material which can produce a sealing action in contact with the turned grooves. As a way of reducing the cost of the sealing sites, furthermore, it is proposed that, before the sets of radial teeth are assembled, they be prepared with a liquid which has enough viscosity to seal off the small channels present along the tips of the radial teeth.

As another measure for promoting more efficient series production, it is proposed that advantage be taken of the leakage around the radial teeth by shifting their positions to points under the main bearings, where the lubricating oil is needed. Thus the first joint site between the front shaft part and the inner shaft part will be located in a plane which is perpendicular to the eccentric shaft and which coincides with the center of the first main bearing under the first sun wheel. The second joint site will be located between a first inner shaft part and a second inner shaft part in a plane which is perpendicular to the eccentric shaft, where the center of the second main bearing is under the second sun wheel. Finally, the third joint site is located between the inner shaft part and the rear shaft part in a plane which is perpendicular to the eccentric shaft and which coincides with the center of the rear main bearing under the rear bearing ring.

Like reciprocating engines, rotary engines also have crankshafts with cranks pointing in different directions. Thus the two eccentrics of an eccentric shaft of a rotary piston engine with two working units are offset 180° from each other; the eccentrics of the eccentric shaft of a rotary piston engine with three working units are offset 120° from each other; and in the case of an eccentric shaft for a rotary piston engine with four working units, the eccentrics are offset 90° from each other. This means that the adjacent radial teeth must be at an angle to each other such that the total number of teeth is divisible by two, three, or four, depending on the number of working units. So that the same front shaft part, the same inner shaft part, and the same rear shaft part can be used to construct rotary piston engines with different numbers of working units, the adjacent radial teeth must be at an angle to each other which, depending on the number of working units, results in a total number of teeth which is composed of the smallest common multiple between two, three, and four. For the production of rotary piston engines with one to four working units, this would mean that there would have to be at least 12 teeth.

The invention is based on the task of creating, for a rotary combustion engine, an eccentric shaft which consists of several parts, where these parts can serve as modules for building eccentric shafts for rotary piston engines with different numbers of working units, and where the parts have an inner annular space, which serves as a distribution chamber for lubricating oil, to which the feed lines leading to the main bearings are connected.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows the location of a set of radial teeth, which are at a certain angle to each other; and FIG. 4 shows the arrangement of a seal at the joint site to seal the joint.

DETAILED DESCRIPTION OF THE PRESENTLY PREFERRED EMBODIMENTS

Figure 1:
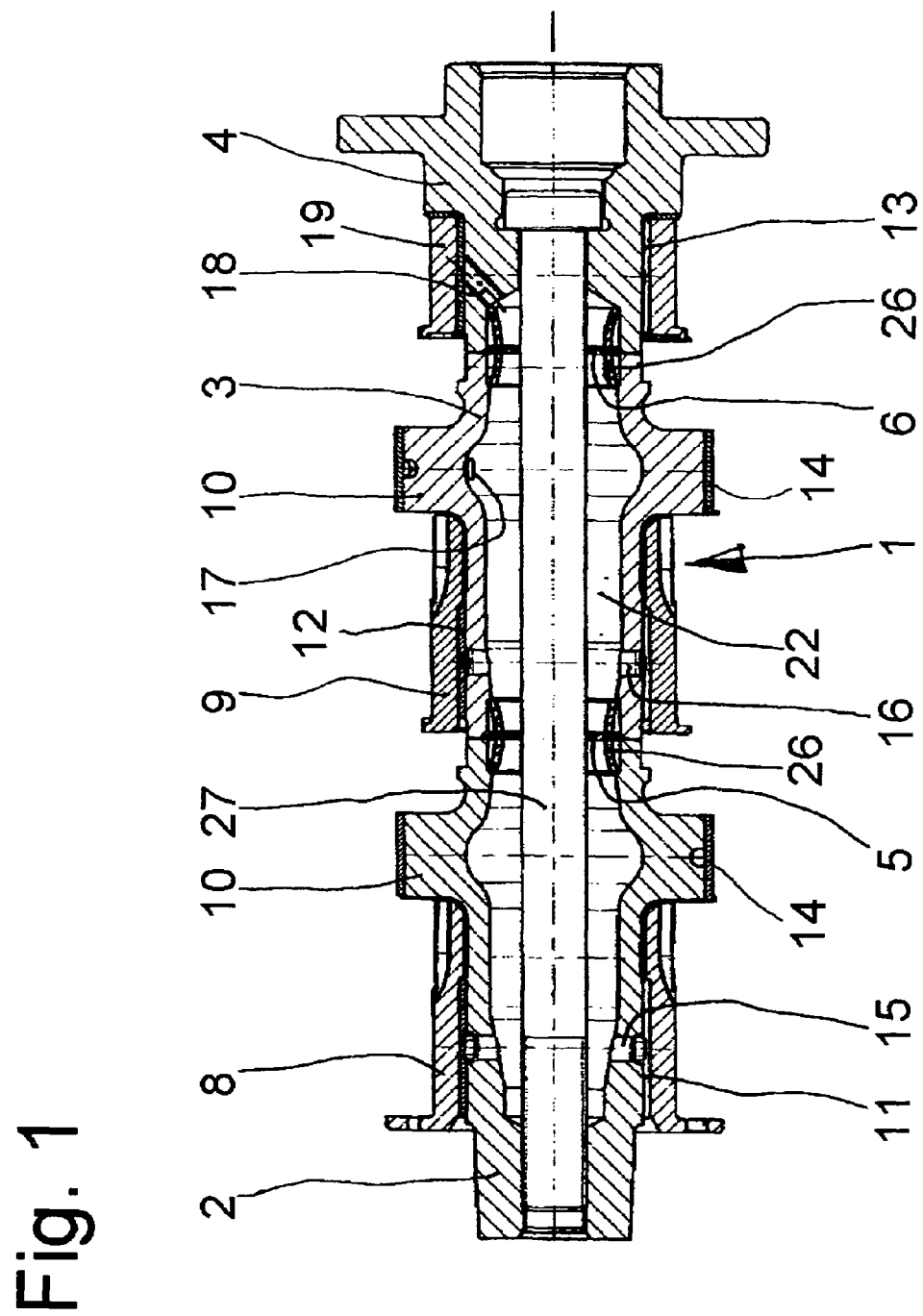
FIG. 1 shows an eccentric shaft consisting of a front shaft part, an inner shaft part, and a rear shaft part with three main bearings and a first and a second joint site.

In FIG. 1, an eccentric shaft 1 includes a front shaft part 2, an inner shaft part 3, and a rear shaft part 4, where the shaft parts 2, 3, 4 are at least partially tubular and accept a tie rod 27, which clamps the shaft parts 2, 3, 4 together. On the end facing the inner shaft part 3, the front shaft part 2 has a profile 20, which engages in a similar profile on the end of the inner shaft part 3 to form a positive connection when the tie rod 27 is tightened. The profile 20 is preferably designed as a set of radial teeth, which can be produced at low cost in large numbers and with high precision by means of the method called "impact turning". As used herein, the term "radial teeth" means teeth having crests which extend radially. Thus a first joint site 5 is obtained between the front shaft part 2 and the inner shaft part 3, and a second joint site 6 is obtained between the inner shaft part 3 and the rear shaft part 4.

The front shaft part 2 has a first main bearing 11 under a first sun wheel 8 and an eccentric 10 with an eccentric bearing 14, where an interior annular space 22 is connected to the first bearing 11 by a first lubricating oil bore 15. Similarly, the inner shaft part 3 has a second main bearing 12 under a second sun wheel 9 and an eccentric 10 with an eccentric bearing 14, where the interior annular space 22 is connected to the second main bearing 12 by a second lubricating oil bore 16. The two eccentric bearings 14 are each connected by a third lubricating oil bore 17 to the annular space 22. The rear shaft part 4, finally, has a main bearing 13 at the rear under a rear bearing ring 19, where the annular space 22 is connected to the rear main bearing 13 by a fourth lubricating oil bore 18. During operation of the rotary piston engine, the annular space 22 extending around the tie rod 27 is filled with lubricating oil, which is distributed to the main bearings 11, 12, 13 and the eccentric bearings 14 to be lubricated via the lubricating oil bores 15, 16, 17, 18. Because, for production reasons, the joint sites 5, 6 are not oil-tight, a seal 26 is provided during the assembly of the shaft parts 2, 3, 4 at the first joint site 5 and another at the second joint site 6; these are ring-shaped and are clamped tightly in place when the tie rod 27 is tightened.

Figure 2:
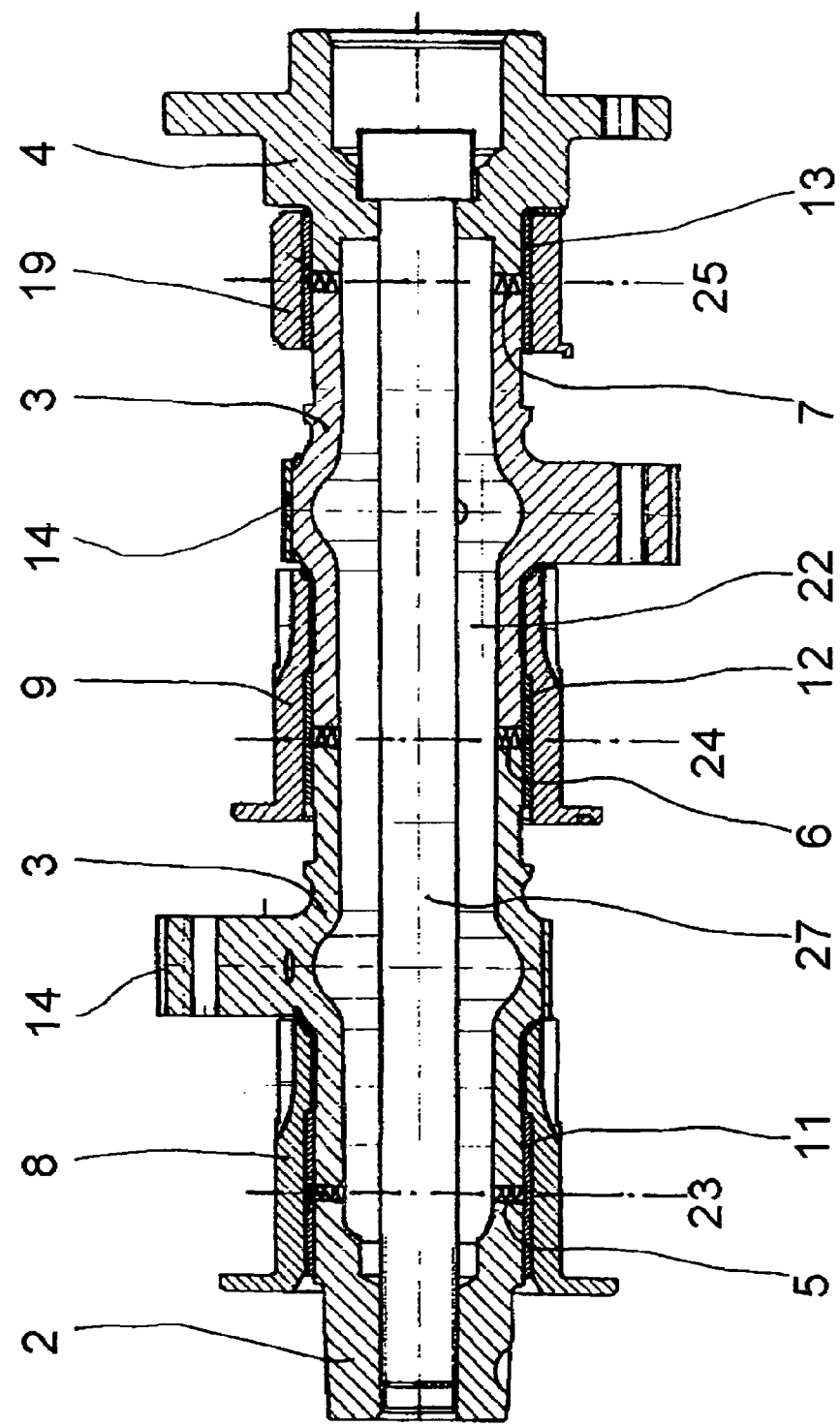
FIG. 2 shows the eccentric shaft with three joint sites under their respective main bearings.

According to FIG. 2, an eccentric shaft 1 for a rotary piston engine with two working units is described, which takes advantage of the leakage which occurs at the sets of radial teeth 20 by shifting the first joint site 5 directly under the first main bearing 11, the second joint site 6 directly under the second main bearing 12, and the third joint site 7 directly under the rear main bearing 13. In addition, the two inner shaft parts 3 are of identical design, so that a streamlined, modular construction method is obtained. The eccentrics 10 are offset 180° from each other, so that the second joint site 6 must have a set of radial teeth 20 which allows this positioning of the eccentric 10. For technical reasons pertaining to lubrication, therefore, the first joint site 5 is located between the front shaft part 2 and the inner shaft part 3 in a plane 23 perpendicular to the eccentric shaft 1 passing through the centers of the first main bearing 11 and the first sun wheel 8. The second joint site 6 is then located between the first inner shaft part 3 and a second inner shaft part 3 in a plane 24 perpendicular to the eccentric shaft 1 passing through the centers of the second main bearing 12 and the second sun wheel 9. Finally, the third joint site 7 is located between the inner shaft part 3 and the rear shaft part 4 in a plane 25 perpendicular to the eccentric shaft 1 passing through the centers of the rear main bearing 13 and the rear bearing ring 19.

It can be derived from the example of a front shaft part shown in FIG. 3 that there is an angle 21 which defines the set of radial teeth 20 and the number of teeth in the set. For example, an angle of eighteen degrees would define twenty teeth.

FIG. 4 shows the position of a seal 26, which is designed as a ring-shaped body and which is located directly under each of the joint sites 5, 6 in such a way that it seals off the annular space 22 in the interior of the eccentric shaft 1 against the joint sites 5, 6.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An eccentric shaft for a rotary combustion engine having at least one working unit, each working unit comprising a peripheral housing describing an epitrochoidal orbit and a triangular piston mounted on said eccentric shaft and having three tips which contact said epitrochoidal orbit to form three working spaces, said eccentric shaft comprising:

at least two shaft parts including a front shaft part and a rear shaft part, each shaft part having at least one axial end provided with a mating profile which can mate with the mating profile of another said shaft part at at least one joint site;

a tie rod received through said shaft parts to positively connect said shaft parts at said at least one joint site, said tie rod and said shaft parts forming a space which can be filled with lubricating oil inside said shaft parts; and at least one main bearing for journaling said eccentric shaft, wherein each said joint site is located under a respective said main bearing and is not sealed, whereby lubricating oil can leak from said space inside said shaft parts to the respective said main bearing through the respective said joint site.

2. The eccentric shaft of claim 1, wherein said mating profile comprises a set of radial teeth.

3. The eccentric shaft of claim 2, wherein the total number of radial teeth in each mating profile is divisible by two, three, or four, depending on the number of working units.

4. The eccentric shaft of claim 2, wherein the radial teeth have flanks with radially outer parts which are raised.

* * * * *